Nov. 24, 1936.  W. G. WANFRIED  2,061,724
INSECT GATHERER AND DESTROYER
Filed Dec. 16, 1935  2 Sheets-Sheet 1

Inventor
W. G. Wanfried

By Clarence A. O'Brien and
Hyman Berman
Attorneys

Nov. 24, 1936.  W. G. WANFRIED  2,061,724
INSECT GATHERER AND DESTROYER
Filed Dec. 16, 1935  2 Sheets-Sheet 2
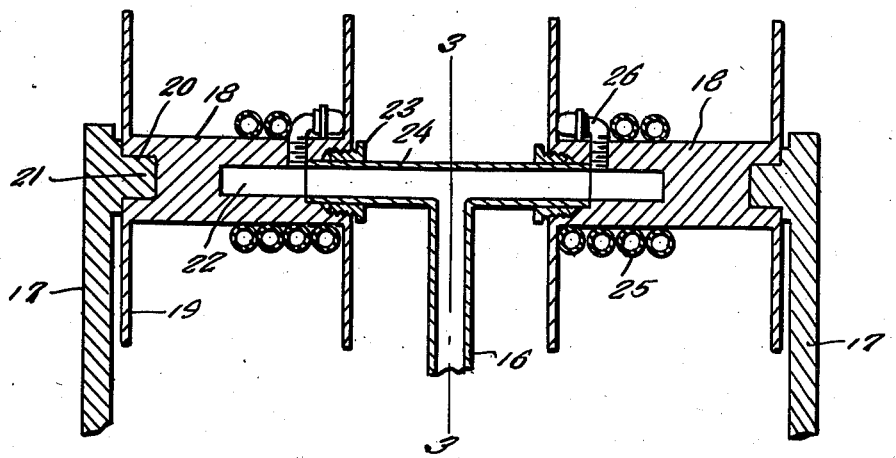
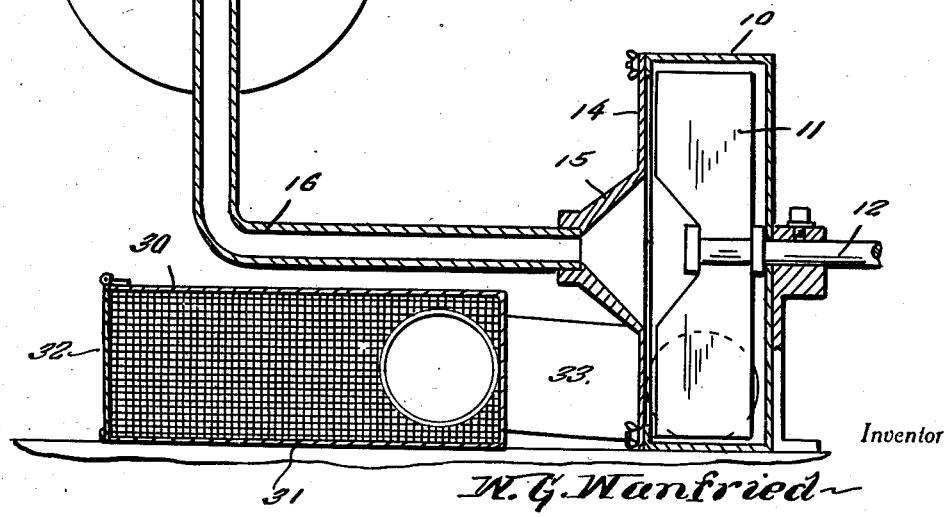

Patented Nov. 24, 1936

2,061,724

UNITED STATES PATENT OFFICE 2,061,724

INSECT GATHERER AND DESTROYER

William G. Wanfried, Hershey, Pa.

Application December 16, 1935, Serial No. 54,763

1 Claim. (Cl. 43—140)

This invention relates to insect gathering and destroying apparatus and particularly to an apparatus especially designed for gathering and destroying Japanese beetles, boll-weevils and analogous inserts.

Briefly the invention consists in a novel combination and arrangement of suction hose, reel for said hose, suction fan and receptacle whereby in an efficient manner the insects may be drawn through the suction hose and into the receptacle provided to receive the insects.

The invention together with its objects and advantages will be best understood from a study of the following description taken in connection with the accompanying drawings wherein:

Figure 2 is a detail sectional view taken substantially on the line 2—2 of Figure 1.

Figure 3 is a detail view taken substantially on the line 3—3 of Figure 2.

Figure 1:
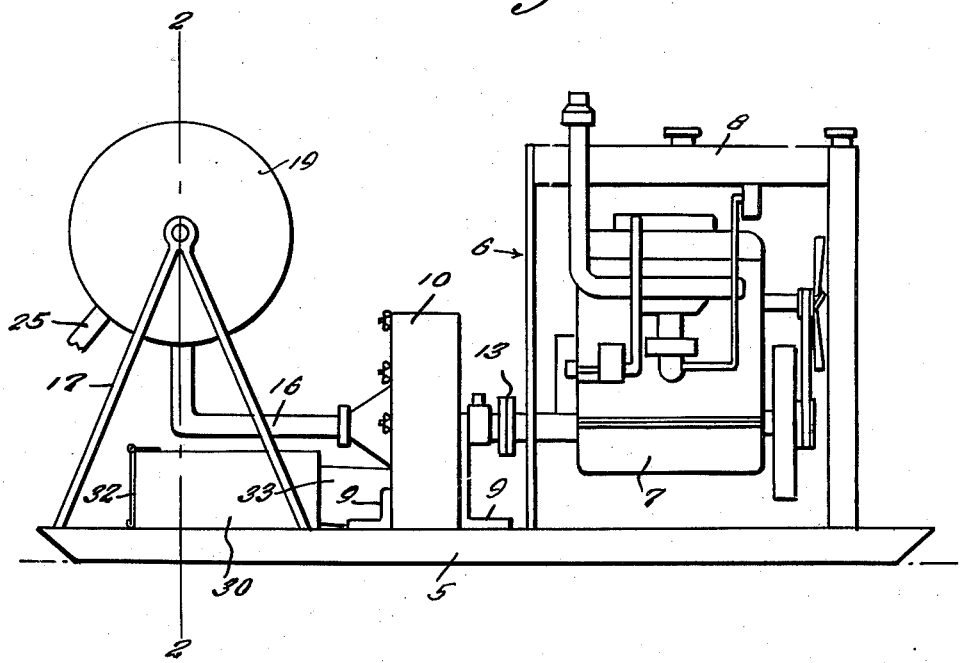
Figure 1 is a side elevational view of the invention.

Referring to the drawings by reference numerals it will be seen that the same in the preferred embodiment thereof comprises a platform or skid 5 from which rises, adjacent one end thereof a suitable supporting structure 6 supporting a prime mover 7 in the form of an internal combustion engine, and also supporting a fuel tank 8 for the engine.

Suitably supported and secured by brackets 9 on the skid 5, intermediate the ends of the latter is a suction fan consisting of a housing 10 in which is mounted a fan 11 supported on a shaft 12 which is connected as at 13 with the crank shaft of the internal combustion engine 7 so as to be driven from said engine.

The fan casing 10 is provided at one side thereof with a removable cover plate 14 provided with a suitable intake neck 15 to which is connected one end of a substantially L-shaped suction pipe 16.

Rising from the skid 5 at the end thereof remote from the engine 7 are standards 17 which support therebetween reels 18.

Each of the reels 18 including a drum or hub portion is equipped at its respective opposite end with flanges 19.

At one end thereof each hub portion is provided with a socket 20 to receive a supporting pin 21 formed on an adjacent standard 17 and extending inwardly from said standard.

Also each hub 18 at the end thereof remote from the socket 20 is provided with an axial recess 22 in one end of which is threaded a gland 23 through which extends a lateral arm 24 provided on the upper end of the pipe 16.

Thus in the manner described and as clearly shown in Figure 2 are the reels 18 supported for rotative movement through the medium of the aforementioned standards 17 and the pipe 16.

Windable on each of the reels 18 is a suction hose 25 one end of which is suitably connected with a nipple 26 tapped into a hub 18 of a reel adjacent the inner end of an arm 24 so that through the medium of the recess 22 and the conduit 16 each hose is in communication with the suction fan casing 10.

On the free end thereof each hose 25 is equipped with a nozzle 27.

Figure 4:
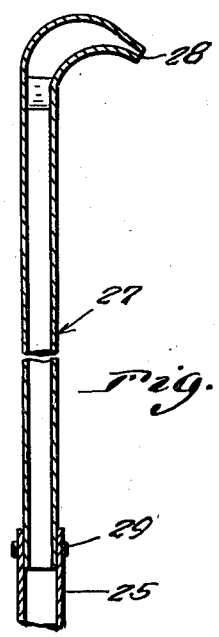
Figure 4 is a longitudinal sectional view through a nozzle.
Figure 5:
Figure 5 is a fragmentary elevational view of a nozzle.

As shown in Figures 4 and 5 nozzle 27 comprises an elongated tubular stem formed at one end with an enlarged curved head having a flat oblong intake mouth 28. The free end of the stem of the nozzle 27 is fitted within an end of the hose 25 and secured within said end of the hose through the medium of a clamping band 29 or the like as shown in Figure 4.

Also resting on the platform or skid 5 is a container 30 at least one wall of which is formed of screening or reticulated material 31 as suggested in Figure 3. At one end the container 30 is provided with a clean out door 32. Adjacent its opposite end the container 30 is connected through the medium of a conduit 33 with one side of the suction fan casing 10 so that the insects drawn into the casing 10 are forced therefrom through the conduit 33 and into the container 30.

It will be apparent that in actual practice the hose 25 are unwound from the reels 18 and with the fan 11 in operation, being driven from the motor 7 the insects will be drawn through the nozzles 27 the hose 25 and pipe 16 into the fan casing 10 and forced from the fan casing through the conduit 33 into the receptacle 30. In this manner are the insects gathered and destroyed.

It will also be apparent that a device of this character may be readily transported from place to place and in actual practice will be thoroughly efficient for the purpose intended.

Having thus described the invention, what is claimed as new is:

In a device of the character described, a suction fan including a housing therefor, an intake pipe extending from one side of the housing and terminating in an upstanding end having oppositely extending lateral arms, a pair of standards, a pair of reels, each of said reels having one end rotatably supported on the standards and the other ends of said reels rotatably supported by the arms of said pipe, sockets in the reels communicating with the respective ends of the arms and a nipple tapped into the hub of each of the reels in the region of said sockets for connecting one end of a hose to each of said hubs.

WILLIAM G. WANFRIED.